US008804662B2

(12) United States Patent
Cakulev et al.

(10) Patent No.: US 8,804,662 B2
(45) Date of Patent: Aug. 12, 2014

(54) METHOD AND APPARATUS FOR COMMUNICATION BETWEEN WIRELESS TELECOMMUNICATIONS NETWORKS OF DIFFERENT TECHNOLOGY TYPES

(75) Inventors: Violeta Cakulev, Millburn, NJ (US); Michael Francis Dolan, Bolingbrook, IL (US); Subramanian Vasudevan, Morristown, NJ (US); Lily H. Zhu, Parsippany, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 508 days.

(21) Appl. No.: 12/935,852

(22) PCT Filed: Mar. 13, 2009

(86) PCT No.: PCT/IB2009/005369
§ 371 (c)(1),
(2), (4) Date: Apr. 20, 2011

(87) PCT Pub. No.: WO2009/122286
PCT Pub. Date: Oct. 8, 2009

(65) Prior Publication Data
US 2011/0188469 A1 Aug. 4, 2011

Related U.S. Application Data

(63) Continuation-in-part of application No. 12/080,015, filed on Mar. 31, 2008, now abandoned.

(51) Int. Cl.
*H04W 4/00* (2009.01)
(52) U.S. Cl.
USPC ............................................ 370/331; 370/328
(58) Field of Classification Search
USPC ....................... 370/331; 455/436, 439, 442
See application file for complete search history.

(56) References Cited

U.S. PATENT DOCUMENTS 6,963,745 B2 * 11/2005 Singh et al. ............... 455/437
(Continued)

FOREIGN PATENT DOCUMENTS

WO   WO 2007/122071    11/2007
WO   WO 2008/033615 A    3/2008

OTHER PUBLICATIONS

XP050028077—Ericsson et al. "CR to 24.801: Optimized Handover Between LIT and HPD" 3GPP Drift, Feb. 20, 2008.*
"Computer Networking and the Internet", Fifth Edition, by Fred Halsall, Addison Wesley, pp. 352-353.*

(Continued)

*Primary Examiner* — Warner Wong
(74) *Attorney, Agent, or Firm* — Fay Sharpe LLP

(57) ABSTRACT

For handover between wireless telecommunications networks of different technology types, an air interface is set up between a first node 4 included in a network of a first technology type and a second node 10 included in a network of a second different technology type. Signaling messaging, in accordance with the second technology type, is related to handover of a mobile terminal from the network of the first technology type to the network of the second technology type. The signaling messaging is encapsulated in a container for transmission over the signaling interface. An identifier is associated with the container to indicate that it encapsulates the signaling messaging. When the identifier is detected at the first node, the container is sent over the interface to the second node. In one method in accordance with the invention, the first technology type is WiMAX and the identifier is a special service flow identifier. This may be detected at an Access Services Network Gateway (ASN GW), for example. A method in accordance with the invention thus permits the use of logical radio channels for encapsulating inter-technology signaling.

15 Claims, 1 Drawing Sheet

(56) References Cited

U.S. PATENT DOCUMENTS

| | | | |
|---|---|---|---|
| 7,171,218 B2 * | 1/2007 | Ikeda et al. | 455/456.1 |
| 7,382,750 B2 * | 6/2008 | Wu | 370/331 |
| 7,570,616 B2 * | 8/2009 | Henrikson | 370/331 |
| 7,912,009 B2 * | 3/2011 | Sayeedi et al. | 370/331 |
| 7,924,785 B2 * | 4/2011 | Shaheen et al. | 370/331 |
| 8,169,968 B1 * | 5/2012 | Stegall et al. | 370/331 |
| 8,289,920 B2 * | 10/2012 | Wang et al. | 370/331 |
| 2005/0243870 A1 * | 11/2005 | Balogh et al. | 370/522 |
| 2006/0109817 A1 * | 5/2006 | Ramanna et al. | 370/331 |
| 2006/0126564 A1 | 6/2006 | Ramanna et al. | |
| 2006/0159047 A1 * | 7/2006 | Olvera-Hernandez et al. | 370/331 |
| 2007/0021119 A1 * | 1/2007 | Lee et al. | 455/436 |
| 2008/0304450 A1 * | 12/2008 | Rexhepi et al. | 370/331 |
| 2008/0318575 A1 * | 12/2008 | Ulupinar et al. | 455/436 |
| 2009/0111468 A1 * | 4/2009 | Burgess et al. | 455/436 |
| 2009/0303962 A1 * | 12/2009 | Jokikyyny et al. | 370/331 |
| 2009/0303966 A1 * | 12/2009 | Cherian et al. | 370/331 |
| 2010/0046477 A1 * | 2/2010 | Marin et al. | 370/332 |
| 2010/0091733 A1 * | 4/2010 | Hahn et al. | 370/331 |
| 2011/0106959 A1 * | 5/2011 | Suciu et al. | 709/230 |

OTHER PUBLICATIONS

Ericsson et al., "CR to 24.801: Optimized Handover Between LIT and HPD," 3GPP Draft; C1-080750, $3^{rd}$ Generation Partnership Project (3GPP), Mobile Competence Centre, 650, Route Des Lucioles, F-06921, Sophia-Antipolis Cedex, France, vol. CT WG1, No. Athens Greece, 20080219, XP050028077, Feb. 20, 2008.

3GPP: $3^{rd}$ Generation Partnership Project; Technical Specification Group Services and System Aspects, Architecture Enhancements for non-3GPP accesses (Release 8), 3GPP Draft, 23402-200, $3^{rd}$ Generation Partnership Project (3GPP), Mobile Competence Centre, 650, Route des Lucioles,F-06921, Sophia-Antipolis Cedex, France, vol. TSG SA, No., Cancun, Mexico, 20071203, XP050210434, Dec. 1, 2007.

Quoc-Thinh Nguyen-Vuong et al., Terminal-controlled Mobility Management in Heterogeneous Wireless Networks,: IEEE Communications Magazine, IEEE Service Center, Piscataway, US, vol. 45, No. 4, pp. 122-129, XP011176569, Apr. 1, 2007.

International Search Report for PCT/IB2009/005369.

QUALCOMM Europe, Prepared Handover with limited impact to source and target systems, 3GPP TSG SA WG2 Architecture-S2#58, S2-072613, Jun. 2007, pp. 1-4.

Japanese Office Action and translation.

* cited by examiner

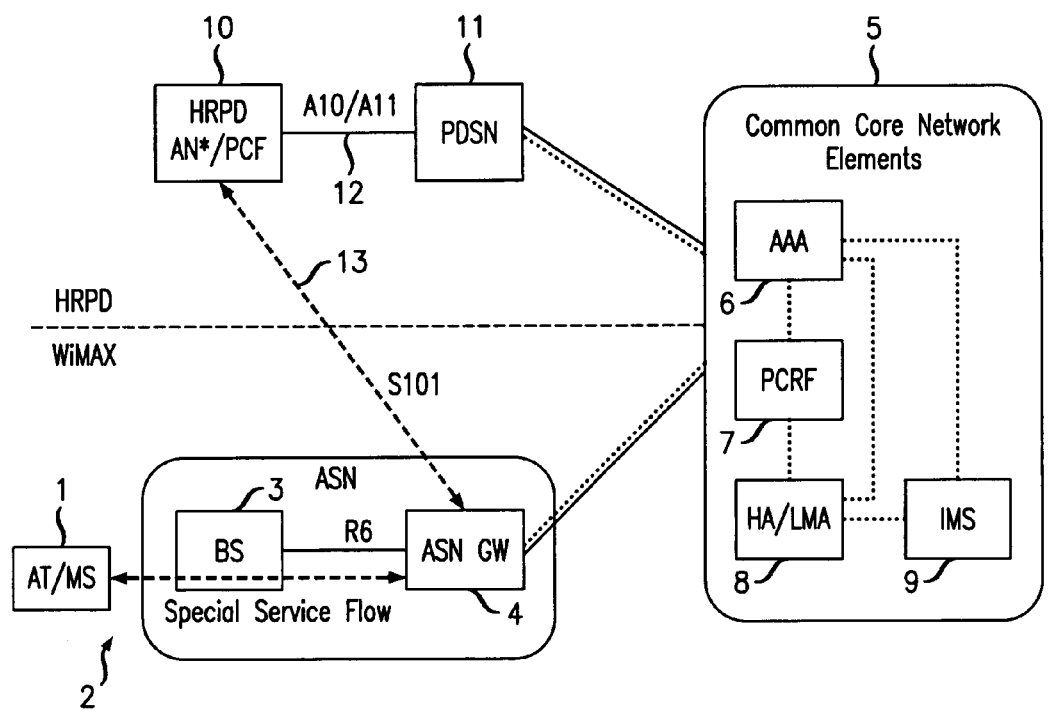

METHOD AND APPARATUS FOR COMMUNICATION BETWEEN WIRELESS TELECOMMUNICATIONS NETWORKS OF DIFFERENT TECHNOLOGY TYPES

This application is a U.S. national filing of PCT/IB2009/005369, filed Mar 13, 2009, which claims benefit of U.S. patent application No. 12/080,015, filed Mar. 31, 2008, which is incorporated herein by reference in its entirety.

FIELD OF THE INVENTION

The present invention relates to a method and apparatus for communication between wireless telecommunications networks of different technology types, and more particularly, but not exclusively, where the different technology types are what is termed 'fourth generation', or '4G', technologies.

BACKGROUND OF THE INVENTION

Currently, efforts in mobile telecommunications developments are directed to providing broadband data communications, known as 3.5G and 4G, using various competing radio access technologies (RATs) aiming to achieve high bandwidth combined with low latency, high efficiencies and flexibility. High Rate Packet Data (HRPD), also referred to as 1xEV-DO or High Data Rate (HDR), is a high-speed CDMA-based wireless data technology. WiMAX is an IEEE standard 802.16e for mobile technology. Long Term Evolution (LTE) is a Third Generation Partnership Project (3GPP) for enhancing UMTS. Ultra Mobile Broadband (UMB) is a 3GPP2 project.

A mobile terminal (MS) may have a capability for communicating with networks of different technology types. If conditions deteriorate, for example, when the mobile terminal is connected to a node in one network, it may be desirable to transfer it to a new connection, which may be another node of the same network or a node in a different network. Signaling messaging is required between the mobile terminal and elements of a potential new target network node so as to complete handover preparation, for example, by transferring information regarding the context of the mobile terminal, and to carry out handover from a source node to a target node once the necessary steps have been fulfilled. If handover involves transfer between networks of different technology types, some mechanism must be provided to permit signaling messaging for use in making a connection between the mobile terminal and the target node to be sent to the target network to establish communication between them.

One problem during inter-technology handover (HO) is timing for real-time services. It is desirable that the traffic interruption during such HO is kept within 300 ms to make the HO seamless and reduce the likelihood of real-time service being degraded.

Each Radio Access Technology (RAT) uses different protocols and architectures to establish an IP (Internet Protocol) service for an MS. Many of them involve the setup of the Radio Access Network session for the MS and the setup of L3 connectivity. For example: WiMax requires WiMax RAN access and WiMax session and IP session setup. HRPD requires HRPD session, PPP session and MIP session setup. Each one of these setups may take any time between 1-5 seconds. Therefore, the setup of these sessions and reservation of the resources must be done in a "make-before-break" fashion, that is, before the actual HO execution. This is achieved by "tunneling" of target technology messages over the current serving technology.

One possible tunneling mechanism is to rely directly on the IP network of the serving technology, which may be termed IP encapsulation, and tunnel the "pre-registration" directly from serving technology, via the Home Agent (HA), to the target technology's Radio Access Network (RAN).

BRIEF SUMMARY OF THE INVENTION

According to a first aspect of the invention, A method for communication between wireless telecommunications networks of different technology types, including the steps of:

setting up an air interface between a mobile terminal and a first node included in a network of a first technology type;

setting up a signaling interface between the first node included in a network of a first technology type and a second node included in a network of a second different technology type;

providing messaging over the air interface related to handover of a mobile terminal from the network of the first technology type to the network of the second technology type;

providing signaling messaging over the signaling interface in accordance with the second technology type, the signaling messaging being related to the handover;

encapsulating the signaling messaging in a container for transmission over the signaling interface;

associating an identifier from the messaging provided over the air interface with the container to indicate that the container encapsulates said signaling messaging;

and, when the identifier is detected at the first node, sending the container over the signaling interface to the second node.

In one method in accordance with the invention, the first technology type is WiMAX and the identifier is a special service flow identifier. This may be detected at an Access Services Network Gateway (ASN GW), for example. A method in accordance with the invention thus permits the use of logical radio channels for encapsulating inter-technology signaling.

By using a method in accordance with the invention, it is not necessary to rely on IP tunneling and thus security issues associated with IP communications, such as Denial of Service attacks, hijacking of sessions and exposure of RAN equipment to hackers, may be avoided during the handover process. Additionally, by using the invention, the source node may be made aware that the mobile terminal is signaling to the second technology in preparation for a handover, whereas this would not visible to a source node if IP encapsulation were to be used instead. Also, by employing a method in accordance with the invention, delays are reduced as there is no need to rely on existing L3 protocols, this being particular advantageous for real time applications such as speech.

In one method in accordance with the invention, the first technology type is WiMAX and the second technology type may be HRPD, for example. The method may also be applied where the first technology type is HRPD and the second technology type is WiMAX.

A method in accordance with the invention may use first and second technology types that are respective ones of the following technology types: High Rate Packet Data (HRPD); WiMAX; Long Term Evolution (LTE); and Ultra Mobile Broadband (UMB). Future evolutions of these or other types of technology may be used.

In one method in accordance with the invention, the interface is an S101 interface, although another common interface standard may be adopted instead. The S101 interface has been proposed for use in inter-RAT communications for communication between LTE and HRPD networks. By adopting the S101 interface for other combinations of technology types, compatibly issues are reduced and there is no need to modify interfaces between different types for each specific combination, aiding backward compatibility and easing later system upgrades and providing a scalable solution.

Where the first technology type is HRPD, the identifier may, in one method, be in the form of a signaling link protocol (SLP) identifier.

In a method in accordance with the invention, the interface may be an S101 interface. This is an interface defined initially for use between an LTE network and an HRPD network. The present inventors have realized that such an interface may be more generally applied for use as an interface between networks with other combinations of technology types.

According to a second aspect of the invention, a node for a wireless telecommunications network of a first technology type comprises: a detector for detecting an identifier associated with a message container, the identifier indicating that the container encapsulates handover signaling messaging in accordance with a second technology type different to the first technology type; and a transmitter for transmitting a container having the detected identifier over a signaling interface with another node included in a wireless telecommunications network of the second technology type. The first and second technology types may be respective ones of the following technology types: High Rate Packet Data (HRPD); WiMAX; Long Term Evolution (LTE); and Ultra Mobile Broadband (UMB). Other types of technology or evolutions of these may be used.

According to a third aspect of the invention, a mobile terminal having the capability of communicating with networks of at least two respective different technology types is operative, during handover preparation for handover from a first network of a first technology type to a second network of a second technology type, to add an identifier to signaling messaging for use in the second network to indicate that the signaling messaging is to be tunneled from the first network to the second network over an interface. The first and second technology types may be respective ones of the following technology types: High Rate Packet Data (HRPD); WiMAX; Long Term Evolution (LTE); and Ultra Mobile Broadband (UMB). Other types of technology or evolutions of these may be used.

BRIEF DESCRIPTION OF THE DRAWING

Some embodiments and methods in accordance with the present invention are now described by way of example only, and with reference to the accompanying drawings, in which:

FIG. 1 schematically illustrates a wireless telecommunications system having two networks of respective different technology types.

DETAILED DESCRIPTION

With reference to FIG. 1, an access terminal (or mobile terminal) (AT/MS) 1 is in communication with a WiMAX network 2, being connected to a base station 3. The base station 3 is connected via an ASN GW 4 to common core network elements shown at 5 and including Authentication, Authorization and Accounting server (AAA) 6, Policy and Charging Rules Functions (PCRF) 7, Home Agent/Location Manager (HA/LMA) 8 and IP Multimedia Subsystem (IMS) 9 entities.

Another network of a second technology type, HRPD, includes an HRPD Access Network and Policy Control Function (AN*/PCF) second node 10 which connects to a Packet Data Serving Node (PDSN) 11 via the A10/A11 interface 12. The PDSN 11 connects to the common core network elements shown at 5.

In a WiMAX network, all traffic received over the WiMAX air interface from the MS 1 is sent from the Foreign Agent (FA), which is part of the ASN-GW 4, to the Home Agent (HA). The ASN-GW 4 is the network node that performs RAN control and routing. After transmission to the HA, the traffic is subsequently routed to its destination using standard IP routing.

Over the WiMAX air interface, an MS may have multiple service flows (SF) simultaneously, and each SF has a unique identifier, SFID. The WiMAX ASN-GW 4 is the network element that performs IP classification and mapping of IP flow to WiMAX SF and vice versa. To create the equivalent of S101 interface with the HRPD RAN, similar to that between LTE and HRPD networks, the ASN-GW 4 detects all tunneled signaling messages, intercepting them to perform special routing to the HRPD RAN instead of going via the standard WiMAX 'FA to HA' tunneling mechanism.

In a method in accordance with the invention, a special service flow is created. This is a flow of traffic that can be identified by its unique ID in the RAN, instead of by its IP classifier such as source/destination address, source/destination port number, protocol ID, and so on.

In a WiMAX to HRPD handoff, the ASN-GW 4 creates a secure tunnel between itself and the HRPD RAN (there could be more than one tunnel for load sharing purpose) to carry an S101 interface 13 between the ASN-GW 4 and the HRPD AN*/PCF node 10. The MS uses a special flow from AT/MS 1 to ASN-GW 4 to send any HO trigger it may detect, for example, such as change in signal strength. The ASN-GW 4 also uses a special flow from ASN-GW 4 to AT/MS 1 to convey any network information, such as neighbor list of co-located HPRD BSs and/or border cell notification to AT/MS, to assist HO. For all AT/MS-originated messages destined for HRPD RAN for HRPD session setup, the ASN-GW 4 recognizes the special service flow ID, which is a unique globally known SF ID, and uses the secure tunnel established earlier as S101 to deliver messages, the signaling messaging being encapsulated in a container which also includes an identifier as to its contents.

From the point of view of the ASN-GW 4, all the tunneled signaling messages from HRPD RAN are received as if they come directly from a WiMAX terminal via a WiMAX BS that carries the WiMAX air interface over the WiMAX R6 interface, such as subscriber station (SS) association as if AT/MS has performed a successful ranging, authentication exchange, initial SF creation, IP connectivity setup, etc.

Thus, the special service flow initiated by ASN-GW 4 and/or AT/MS 1 is used for intercepting and sending HRPD session set-up messages between AT/MS and HRPD RAN, sent as a WiMAX payload. This avoids the need for a special tunneling capability on the WiMAX air interface.

For handover from HRPD to one of LTE, WiMAX or UMB networks, for example, the same mechanism may be applied. HRPD air interface has the concept of Radio Link Protocol (RLP) flows and Signaling Link Protocol (SLP) flow. RLP flow corresponds to A10 connection (R-P) with PDSN. SLP flow is used for HRPD signaling messages and it terminates in HRPD radio network controller (RNC). Each MS may support multiple RLP flows, similar to service flows in WiMAX. By applying the same technique of identify the HO tunneling message using the special SLP-like flow ID, the HRPD RNC can create the same S101 interface from HRPD to LTE, WiMAX or UMB, as applicable.

Thus, it is possible to minimize changes to deployed networks while providing network control of handover, to maintain security of HRPD RAN, and use single interface from HRPD to a number of emerging technologies, such as WiMAX, LTE and UMB.

A method and embodiment in accordance with the invention may be deployed without modifying either the HRPD or WiMAX radio interfaces, thus avoiding impact on existing radio interfaces. Changes may be isolated to specific equipment such as RNCs. This potentially leads to a large cost saving over both making radio interface changes and adding security mechanisms such as firewalls.

Coordination of the radio handover with the bearer path switching is critical, and cannot be efficiently managed by the mobile alone. The network must be involved. This special flow-based tunneling provides operators with security and flexibility for optimization compared to regular IP connection.

The re-use of certain approaches from LTE to HRPD handover allows an operator for flexibility in making business decisions regarding technologies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for communication between wireless telecommunications networks of different technology types, said method comprising:
    setting up an air interface between a mobile terminal and a first node included in a network of a first technology type;
    setting up a signaling interface between the first node included in a network of a first technology type and a second node included in a network of a second different technology type, wherein the first node is an access services network node belonging to the network of the first technology type and the second node is a radio access network node belonging to the network of the second different technology type;
    providing messaging over the air interface related to handover of a mobile terminal from the network of the first technology type to the network of the second technology type;
    providing signaling messaging over the signaling interface in accordance with the second technology type, the signaling messaging being related to the handover;
    encapsulating the signaling messaging in a container for transmission over the signaling interface;
    associating an identifier from the messaging provided over the air interface with the container to indicate that the container encapsulates said signaling messaging; and
    when the identifier is detected at the first node, sending the container over the signaling interface to the second node;
    wherein the identifier is a special service flow identifier.

2. The method as claimed in claim 1, wherein the first technology type is WiMAX.

3. The method as claimed in claim 2 and wherein the identifier is detected at an Access Services Network Gateway (ASN GW).

4. The method as claimed in claim 1 and wherein the second technology type is HRPD.

5. The method as claimed in claim 1 and wherein the first technology type is HRPD.

6. A method for communication between wireless telecommunications networks of different technology types, including the steps of:
    setting up an air interface between a mobile terminal and a first node included in a first network of a first technology type;
    setting up a signaling interface between the first node and a second node included in a second network of a second technology type, said second technology type being different from the first technology type;
    providing messaging over the air interface related to a handover of a mobile terminal from the first network to the second network;
    providing signaling messaging over the signaling interface in accordance with the second technology type, the signaling messaging being related to the handover;
    encapsulating the signaling messaging in a container for transmission over the signaling interface;
    associating an identifier from the messaging provided over the air interface with the container to indicate that the container encapsulates said signaling messaging; and
    when the identifier is detected at the first node, sending the container over the signaling interface to the second node;
    wherein the identifier is one which terminates at a High Rate Packet Data (HRPA) Radio Network Controller (RNC).

7. The method as claimed in claim 6 and wherein the identifier is a signaling link protocol (SLP) identifier.

8. The method as claimed in claim 1 and wherein the first and second technology types are respective ones of the following technology types: High Rate Packet Data (HRPD); WiMAX; Long Term Evolution (LTE); and Ultra Mobile Broadband (UMB).

9. The method as claimed in claim 1 and wherein the signaling interface is an S101 interface.

10. A node for a wireless telecommunications network of a first technology type, the node comprising: a detector for detecting an identifier associated with a message container, the identifier indicating that the container encapsulates handover signaling messaging in accordance with a second technology type different from the first technology type; and a transmitter for transmitting a container having the detected identifier over a signaling interface with another node included in a wireless telecommunications network of the second technology type, wherein the node is an access services network node belonging to the network of the first technology type and the another node is a radio access network node belonging to the network of the second technology type.

11. The node as claimed in claim 10 and wherein the first and second technology types are respective ones of the following technology types: High Rate Packet Data (HRPD); WiMAX; Long Term Evolution (LTE); and Ultra Mobile Broadband (UMB).

12. The node as claimed in claim 10 and wherein the signaling interface is an S101 interface.

13. A mobile terminal having the capability of communicating with networks of at least two respective different technology types and operative, during handover preparation for handover from a first network of a first technology type to a second network of a second technology type, to add an identifier to signaling messaging for use in the second network to indicate that the signaling messaging is to be tunneled from the first network to the second network over an interface.

14. The mobile terminal as claimed in claim 13 and wherein the first and second technology types are respective ones of the following technology types: High Rate Packet Data (HRPD); WiMAX; Long Term Evolution (LTE); and Ultra Mobile Broadband (UMB).

15. The mobile terminal as claimed in claim 13 and wherein the interface is an S101 interface.

* * * * *